US011320065B2

(12) United States Patent
Hughes et al.

(10) Patent No.: US 11,320,065 B2
(45) Date of Patent: May 3, 2022

(54) TUBING AND CABLE ORGANIZING DEVICE

(71) Applicant: Neotech Products LLC, Valencia, CA (US)

(72) Inventors: Robin Hughes, Kenmore, WA (US); Carol Herndon, West Hills, CA (US); Craig McCrary, Valencia, CA (US); Lawrence Kiliszewski, The Woodlands, TX (US)

(73) Assignee: Neotech Products LLC, Valencia, CA (US)

( * ) Notice: Subject to any disclaimer, the term of this patent is extended or adjusted under 35 U.S.C. 154(b) by 0 days.

(21) Appl. No.: 16/848,122

(22) Filed: Apr. 14, 2020

(65) Prior Publication Data

US 2020/0326018 A1 Oct. 15, 2020

Related U.S. Application Data

(60) Provisional application No. 62/920,114, filed on Apr. 15, 2019.

(51) Int. Cl.
| | |
|---|---|
| *F16L 3/06* | (2006.01) |
| *F16L 3/24* | (2006.01) |
| *F16L 3/22* | (2006.01) |
| *F16L 3/16* | (2006.01) |

(52) U.S. Cl.
CPC ............ *F16L 3/06* (2013.01); *F16L 3/16* (2013.01); *F16L 3/221* (2013.01); *F16L 3/245* (2019.08)

(58) Field of Classification Search
CPC ...... F16L 3/06; F16L 3/01; F16L 3/245; F16L 3/16; H02G 3/30; H02G 3/34; A61M 5/1414; A61M 5/1415; A61M 5/1417; A61M 5/1418; A61M 2209/08; A61M 2209/082; A61M 2209/084; A61M 2209/088

See application file for complete search history.

(56) References Cited

U.S. PATENT DOCUMENTS

| 1,964,849 | A | * | 7/1934 | Gordon | ............. F16L 3/00 248/303 |
|---|---|---|---|---|---|
| 3,519,231 | A | * | 7/1970 | Miller | ............. A61J 9/0638 248/106 |
| 4,387,871 | A | * | 6/1983 | Loniello | ............. H05B 3/66 219/537 |
| 4,407,472 | A | * | 10/1983 | Beck | ............. A62C 33/04 24/339 |

(Continued)

FOREIGN PATENT DOCUMENTS

| WO | WO-2009038553 A1 | * | 3/2009 | ............ A61J 9/0607 |
|---|---|---|---|---|
| WO | WO-2016035062 A1 | * | 3/2016 | ............ A61J 9/0661 |

*Primary Examiner* — Eret C McNichols
(74) *Attorney, Agent, or Firm* — Kelly & Kelley, LLP (57) ABSTRACT

A tubing and cable organizing device that has a main body attachable to a substrate, such as a surface, a wall, a rail, and IV pole or similarly situated surface in a medical treatment area. The organizing device having one or more bendable and non-resilient appendages extending away from the main body and configured for holding or supporting tubing and cables in a medical treatment area. The main body and appendages being covered in an elastic coating that is capable of being formed into decorative shapes or decorative colors.

19 Claims, 12 Drawing Sheets

(56) References Cited

U.S. PATENT DOCUMENTS

| | | | | |
|---|---|---|---|---|
| 4,666,111 A * | 5/1987 | Schuler | A61M 5/1415 | 248/125.1 |
| 4,690,674 A * | 9/1987 | Dalglish | A61G 7/0503 | 128/DIG. 26 |
| 5,083,732 A * | 1/1992 | Akamine | A63H 3/003 | 248/104 |
| 5,309,604 A * | 5/1994 | Poulsen | A61M 5/1418 | 24/16 R |
| 6,134,754 A * | 10/2000 | Hansson | A61M 25/02 | 24/115 R |
| 6,386,490 B1 * | 5/2002 | Suh | A61J 9/0638 | 248/104 |
| 6,848,663 B2 * | 2/2005 | Olive | A01G 9/128 | 248/317 |
| 7,451,509 B2 * | 11/2008 | Dawes | A47C 20/023 | 5/621 |
| 7,546,993 B1 * | 6/2009 | Walker | A61M 5/1415 | 248/218.4 |
| 7,731,138 B2 * | 6/2010 | Wiesner | F16M 11/24 | 248/160 |
| 7,766,289 B2 * | 8/2010 | Newkirk | A61G 7/051 | 248/176.1 |
| 7,849,537 B2 * | 12/2010 | Graham | A61M 5/1415 | 5/503.1 |
| 8,133,039 B2 * | 3/2012 | Anderson | A61H 9/0078 | 417/360 |
| 8,220,757 B2 * | 7/2012 | Gardner | F16L 3/2431 | 248/58 |
| 8,282,046 B2 * | 10/2012 | Harding | A61J 1/00 | 248/49 |
| D683,849 S * | 6/2013 | Breckon | D24/128 | |
| 8,460,272 B2 * | 6/2013 | Kudo | A61M 39/08 | 604/524 |
| 8,596,588 B1 * | 12/2013 | Sikkema | H02G 3/30 | 248/58 |
| 8,777,171 B2 * | 7/2014 | Gainey, Jr. | G01N 1/2214 | 248/231.71 |
| 9,322,493 B2 * | 4/2016 | Wolff | F16L 3/06 | |
| 9,511,185 B2 * | 12/2016 | Slaker | A61M 5/1418 | |
| 9,938,062 B1 * | 4/2018 | Scarlett | B65D 63/04 | |
| 10,137,268 B2 * | 11/2018 | Reinberg | F16M 11/041 | |
| 10,835,667 B1 * | 11/2020 | Rogers | A61M 5/1415 | |
| 2002/0118535 A1 * | 8/2002 | Nostrant | F21V 21/406 | 362/124 |
| 2006/0249635 A1 * | 11/2006 | Newkirk | F16M 13/02 | 248/74.1 |
| 2006/0253109 A1 * | 11/2006 | Chu | A61B 17/0206 | 606/1 |
| 2007/0045481 A1 * | 3/2007 | Adams | A61M 16/0875 | 248/59 |
| 2007/0170318 A1 * | 7/2007 | Gunerman | F16M 11/14 | 248/68.1 |
| 2008/0011907 A1 * | 1/2008 | Jacobsma | F16L 33/035 | 248/62 |
| 2008/0236588 A1 * | 10/2008 | Livingston | A61M 16/06 | 128/205.25 |
| 2009/0039210 A1 * | 2/2009 | Yates | A61G 7/0503 | 248/74.1 |
| 2010/0204710 A1 * | 8/2010 | Shaw | A61B 17/32056 | 606/113 |
| 2011/0089294 A1 * | 4/2011 | Buytaert | H02G 3/30 | 248/58 |
| 2011/0286217 A1 * | 11/2011 | Martinson | B65D 63/00 | 362/253 |
| 2011/0315832 A1 * | 12/2011 | Box | A61J 9/0692 | 248/103 |
| 2013/0174382 A1 * | 7/2013 | Martinson | B29C 48/21 | 24/27 |
| 2014/0017025 A1 * | 1/2014 | Hemingway | H02G 3/32 | 411/15 |
| 2014/0117170 A1 * | 5/2014 | Sharpe | A61M 5/1418 | 248/65 |
| 2015/0102189 A1 * | 4/2015 | Klamm | F16M 11/40 | 248/160 |
| 2015/0328397 A1 * | 11/2015 | Bally | A47F 5/05 | 211/85.13 |
| 2016/0009470 A1 * | 1/2016 | Martinson | B65D 63/04 | 24/27 |
| 2016/0025243 A1 * | 1/2016 | Vilhelmsen | H02G 3/305 | 248/68.1 |
| 2016/0033076 A1 * | 2/2016 | Hoeltge | A63H 3/50 | 248/205.3 |
| 2016/0167853 A1 * | 6/2016 | Gallup | A47G 29/08 | 248/205.2 |
| 2018/0036206 A1 * | 2/2018 | Clores | A61J 9/0638 | |
| 2018/0312326 A1 * | 11/2018 | Haden | A61J 9/0661 | |
| 2018/0353677 A1 * | 12/2018 | Mager | A61M 5/1415 | |
| 2019/0374705 A1 * | 12/2019 | Staley | F16B 2/10 | |
| 2020/0153218 A1 * | 5/2020 | Kawashima | H02G 3/34 | |
| 2020/0261938 A1 * | 8/2020 | Haden | B05B 15/62 | |
| 2020/0397664 A1 * | 12/2020 | Hafizi | B60N 3/103 | |

* cited by examiner

TUBING AND CABLE ORGANIZING DEVICE

RELATED APPLICATION

This application claims the benefit of U.S. Provisional Application No. 62/920,114, filed on Apr. 15, 2019.

BACKGROUND OF THE INVENTION

The present invention generally relates to a tubing and cable organizing device for use in medical settings, particularly in neonatal or similar pediatric practices. In such medical settings, many tubes and cables, i.e., hoses, wires, leads, etc., are often required for treatment. The presence of so many tubes and cables can create a complicated and confusing area around a patient, both for the patient and the medical providers.

In addition, the random placement of tubes and cables around a patient makes it difficult for a patient to turn or get comfortable in a treatment bed without becoming tangled in the tubes and cables. Conscious and/or adult patients may be aware of the presence of the tubes and cables, so as to alter or limit their movement in the treatment bed, leading to discomfort. Unconscious and/or child patients are almost certainly unaware of the presence of the tube and cables, so as to become entangled in the same when moving in the treatment bed. Infant patients, such as in neonatal ICUs and incubators, even when conscious have no awareness of the tubes and cables or the trouble that could come from becoming entangled in or disconnecting the same.

Accordingly, there is a need for a device or devices to assist in organizing the tubes and cables around a patient in a medical treatment bed. Thus, it would be advantageous to have a device that can lift and hold the tubes and cables in a treatment bed so as to organize the same. The present invention fulfills these needs and provides other related advantages.

SUMMARY OF THE INVENTION

The present invention is directed to a tubing and cable organizing device. The device includes a main body having an inner core covered in an elastic coating. A first appendage that is non-resilient, selectively bendable and covered in the elastic coating extends away from the main body. An attachment mechanism is connected to the inner core of the main body.

The elastic coating is preferably made of silicone. The inner core is preferably made from a foam, a plastic, or a metal body. The inner core has a port configured to receive the attachment mechanism.

The first appendage preferably contains a moldable wire embedded within the elastic coating. The device also includes a second appendage that is non-resilient, selectively bendable and covered in the elastic coating and extends away from the main body at an orientation generally opposite to the first appendage. The second appendage also contains a moldable wire embedded within the elastic coating.

The attachment mechanism preferably includes a suction cup, a c-clamp, a rail adaptor, and/or a spring clamp. The rail adaptor has multiple points of attachment, including a closed rail slot, an open rail clamp, and an open pole clamp. The elastic coating may be formed into a decorative shape or a decorative color. The decorative shape may be an animal, an emoji, a face, a plant, or a toy.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE INVENTION

As shown in the drawings, a tubing and cable organizing device for use in medical settings, particularly in neonatal or similar pediatric practices, is disclosed. The organizing device is generally referred to by reference numeral 10. The organizing device 10 is useful for arranging and organizing tubes and cables in a medical treatment area around a patient, particularly in beds, ICUs, and incubators for neonatal settings.

FIGS. 1-4 generally show a first preferred embodiment of the tubing and cable organizing device 10. The device 10 generally comprises a main body 12 having a first appendage 14 and second appendage 16 extending away from the main body 12. The first appendage 14 and second appendage 16 preferably extend away from the main body 12 in generally opposite directions from generally opposite sides of the main body 12. The device 10 may be constructed with fewer appendages, i.e., only a single appendage or more appendages, i.e., three or more, and still perform most of the same functions and provide most of the same benefits. However, the first and second appendages 14, 16 are particularly ideal as described more fully below.

An inner core 18 is contained within the main body 12. The inner core 18 gives the main body 12 stability and a necessary level of rigidity. An attachments means 20 is attached to one side of the main body 12, preferably connected to a port 20a or similar point of connection to the inner core 18. A medical grade elastic coating 22 is continuous and unitary covering the entire device 10, including the main body 12, first appendage 14, second appendage 16, and inner core 18. The elastic coating 22 is preferably a soft, durable material such as silicone or similar polymeric material. The elastic coating 22 can be formed in to various ornamental designs or ornamental colors as described more fully below.

The first appendage 14 and second appendage 16 are designed to approximate or resemble "arms" extending away from the main body 12. The appendages 14, 16 preferably each end in a hand-like grip 14a, 16a distal from the main body 12. The first appendage 14 contains a moldable wire 24 on the interior of the elastic coating 22. The moldable wire 24 is preferably connected to the inner core 18 such that the first appendage 14 is anchored to the inner core 18 and the main body 12. The distal end of the moldable wire 24 preferably ends in a hook or loop 24a that is contained within the hand-like grip 14a of the first appendage 14. The second appendage 16 also contains a moldable wire 26 that is similar to moldable wire 24. The moldable wire 26 is anchored to the inner core 18 and similarly ends in a hook or loop 26a at the distal end contained within the hand-like grip 16a of the second appendage 16.

With the moldable wires 24, 26, the first and second appendages 14, 16 are selectively bendable, while at the same time being non-resilient. This allows for the first and second appendages 14, 16 to remain static and resist certain minimal forces as may be exerted by the weight of tubes and cables. Due to the selectively bendable nature of the moldable wires 24, 26, a user, i.e., medical provider, can separately bend each of the first and second appendages 14, 16 into selected positions that are necessary to support and hold tubes and cables as desired. Because of the non-resilient nature of the moldable wires 24, 26, the first and second appendages 14, 16 will hold those selected positions until a medical provider selectively bends them to another position.

The inner core 18 may take many forms so long as the core 18 provides form and stability to the main body 12. The inner core 18 may be constructed from solid foam, solid plastic, or solid metal—all medical grade. The port 20a is preferably included in the center of the inner core 18 so as to provide the most balance and uniform distribution of forces with respect to the attachment means 20. The attachment means 20 preferably comprises a suction cup 28, a c-clamp 30, a rail adaptor 32, or a spring clamp (not shown).

Figure 1:
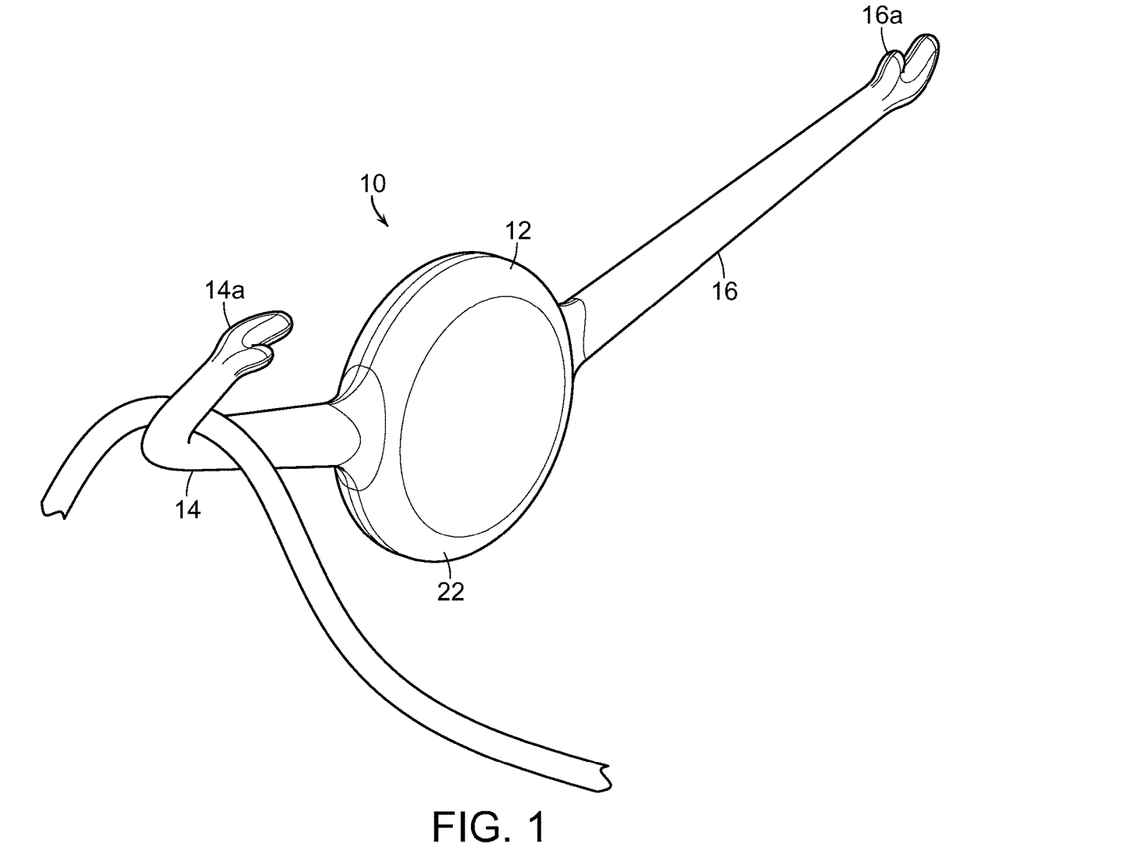
FIG. 1 is a perspective environmental view of a first preferred embodiment of the tubing and cable organizing device according to the present invention.
Figure 2:
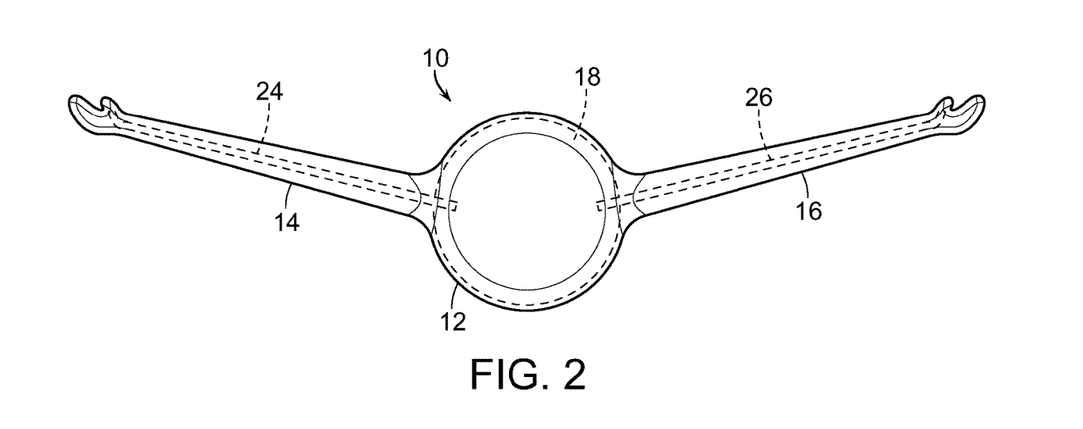
FIG. 2 is a front view of the first preferred embodiment of the tubing and cable organizing device according to the present invention.
Figure 3:
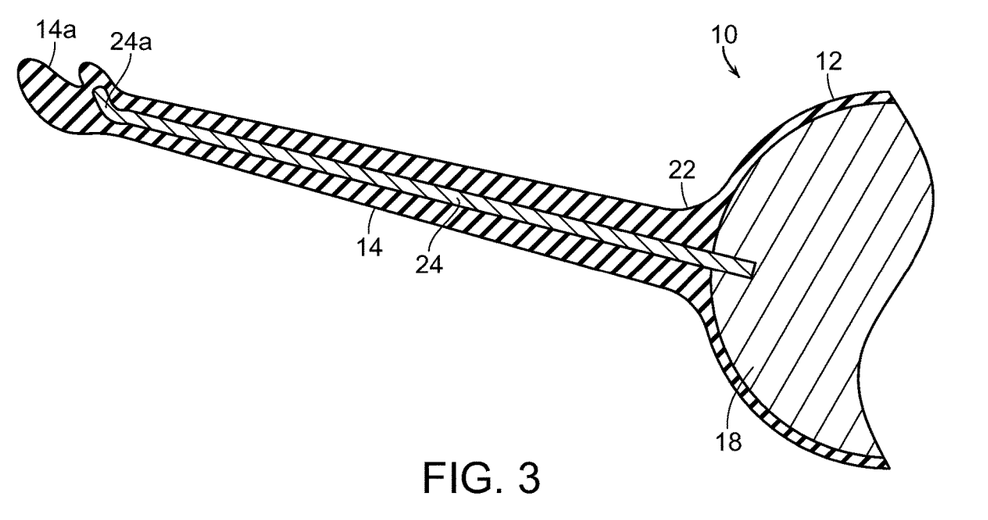
FIG. 3 is a partial cross-sectional view of the first preferred embodiment of the tubing and cable organizing device according to the present invention.
Figure 3A:
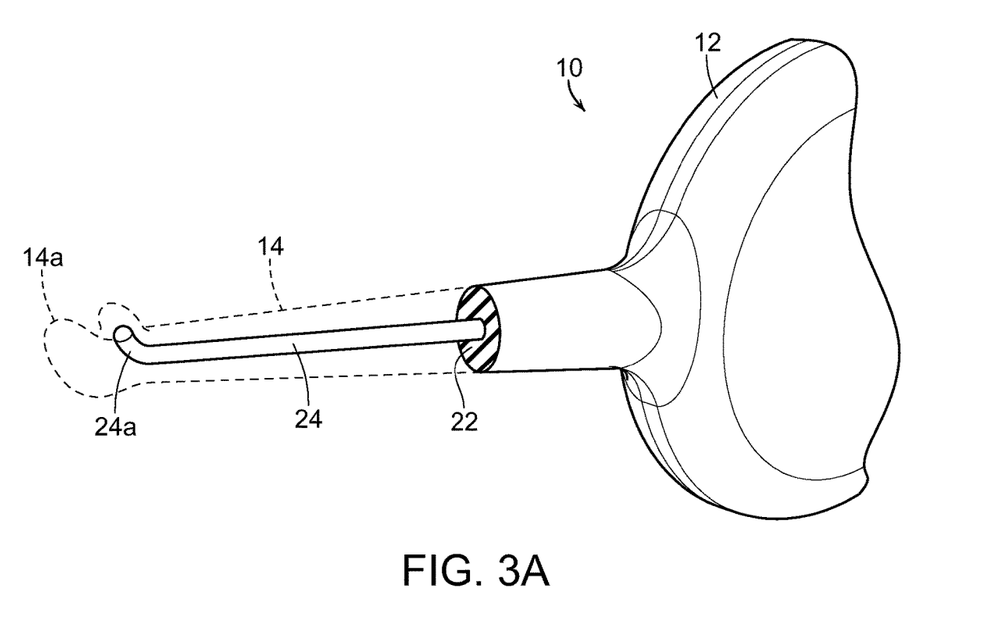
FIG. 3A is a partial cut-away view of the first preferred embodiment of the tubing and cable organizing device according to the present invention.
Figure 4:
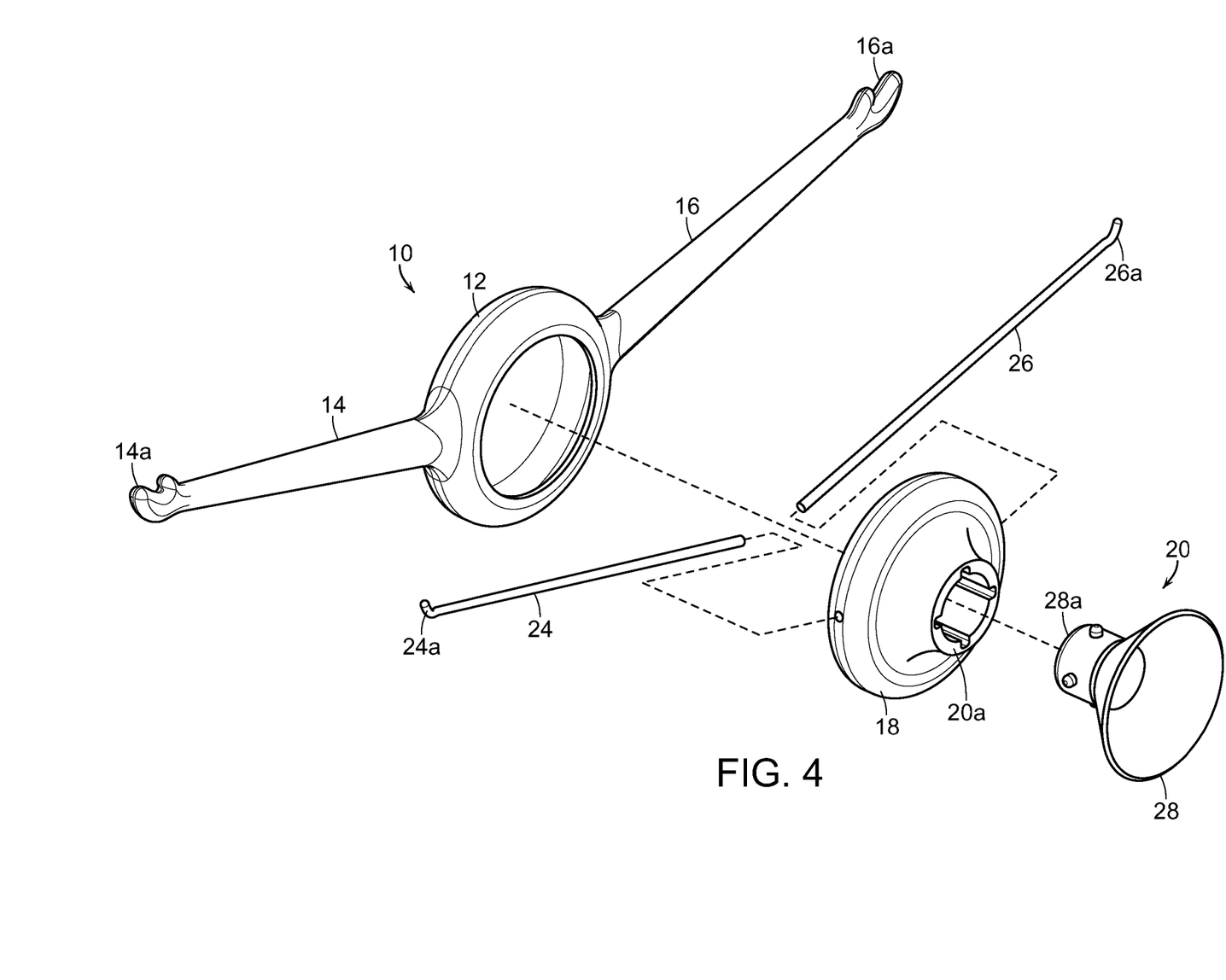
FIG. 4 is an exploded, cross-sectional view of the first preferred embodiment of the tubing and cable organizing device according of the present invention.

As shown in FIG. 4, the suction cup 28 includes a post body 28a configured for insertion connection to the port 20a. The suction cup 28 is configured to attach to any flat surface in a medical treatment area, such as the wall of an incubator or any flat surface on or around a patient's bed.

Figure 5:
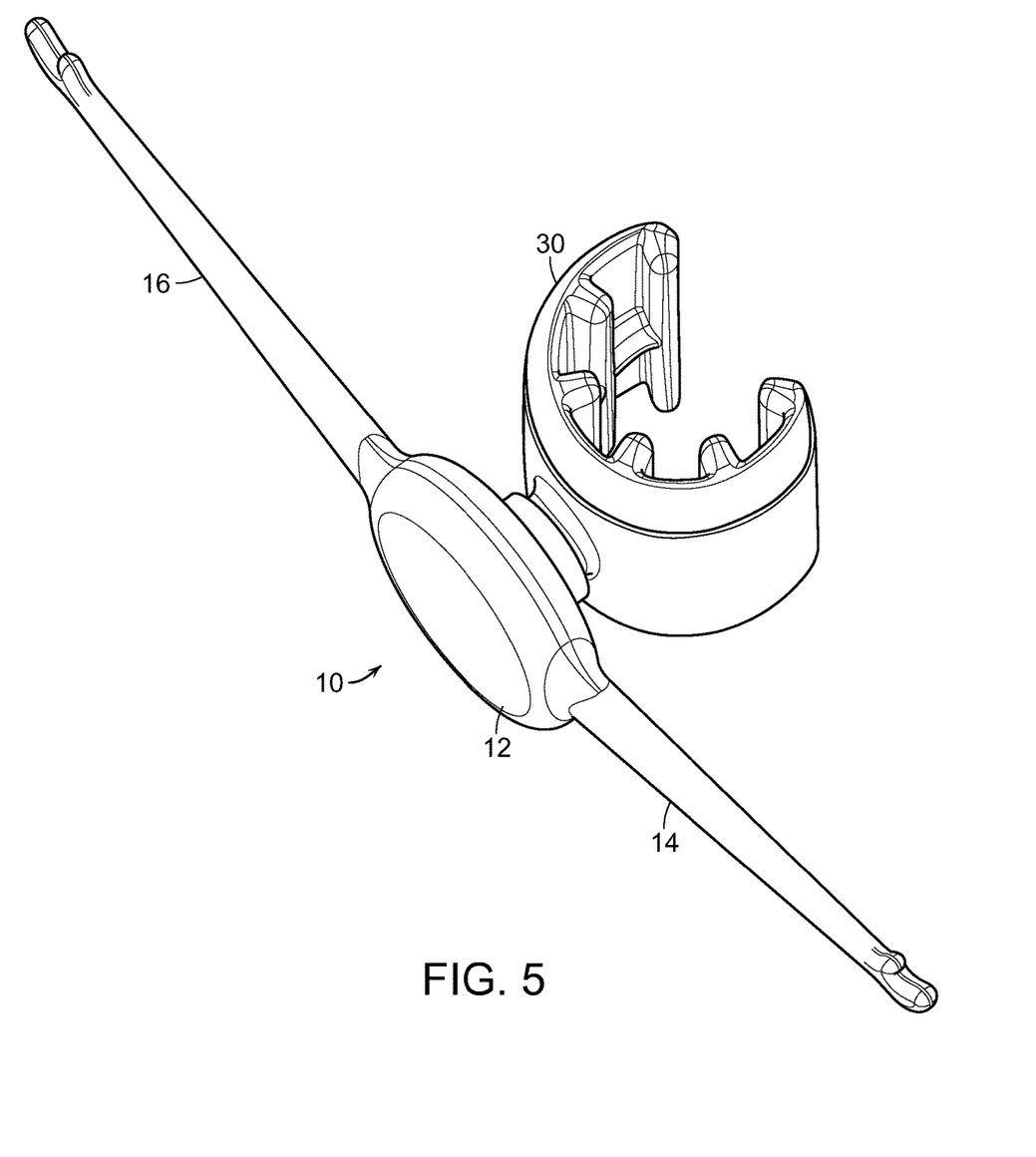
FIG. 5 is a perspective view of a preferred embodiment of a mounting device for use with the tubing and cable organizing device according of the present invention.
Figure 5A:
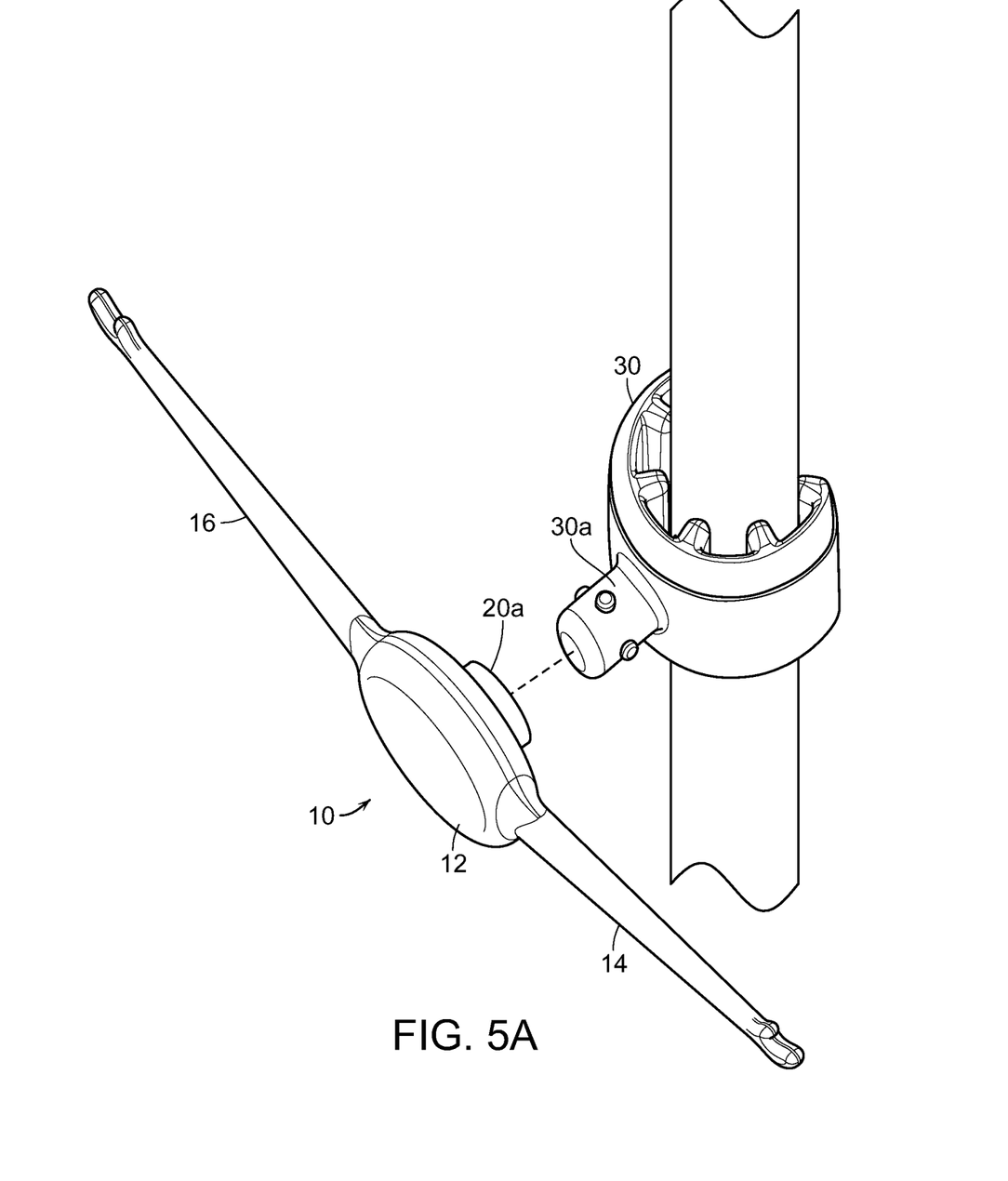
FIG. 5A is an environmental view of the mounting device of FIG. 5 installed on an IV bag pole.

As shown in FIG. 5, the c-clamp 30 includes a post body 30a configured for insertion connection to the port 20a. As shown in FIG. 5A, the c-clamp 30 is configured to attach to any form of IV pole or similarly round structure in the vicinity of a medical treatment area. The c-clamp 30 can also be configured for attachment to a non-round structure in the vicinity of a medical bed.

Figure 6:
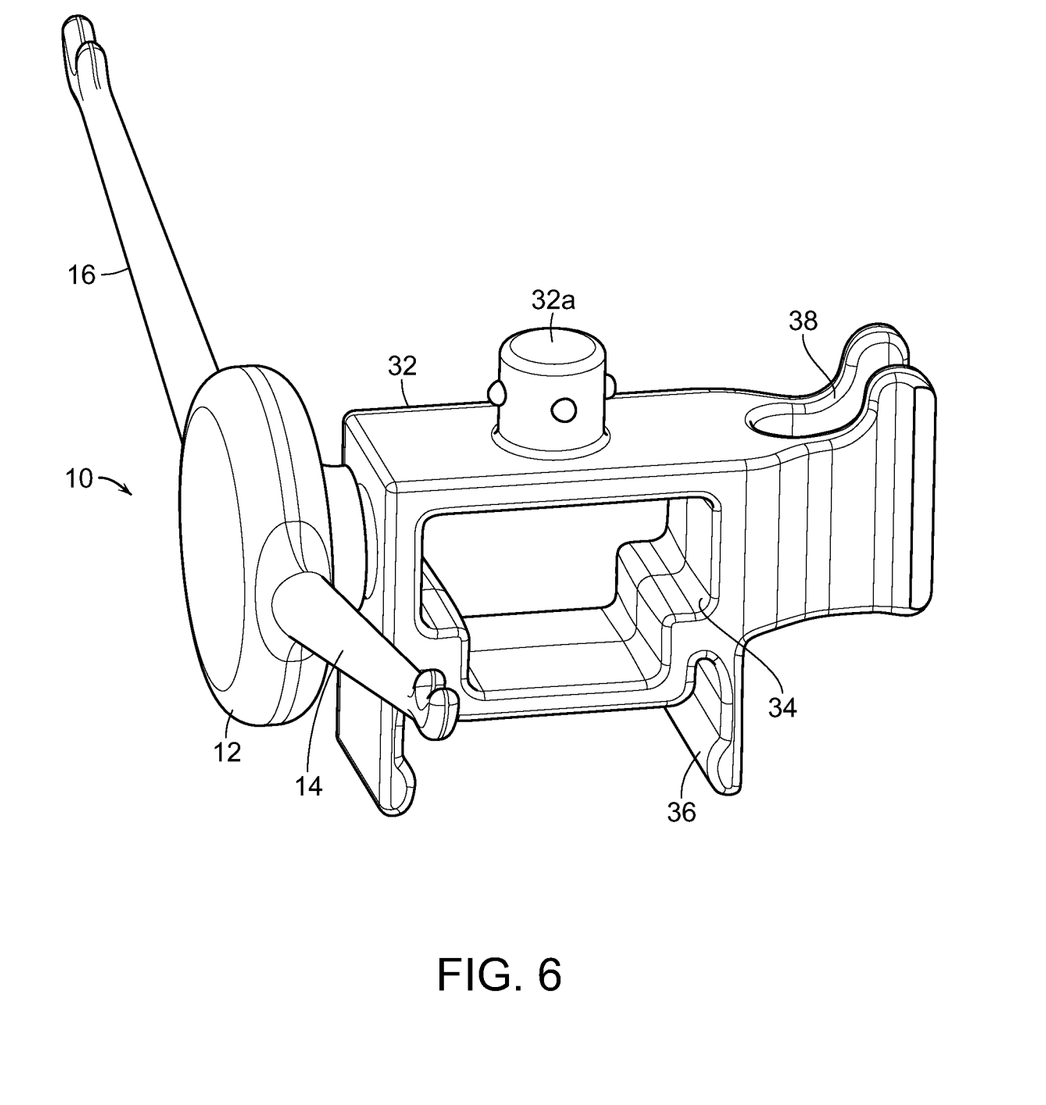
FIG. 6 is a perspective view of another preferred embodiment of a mounting device for use with the tubing and cable organizing device according of the present invention.
Figure 6A:
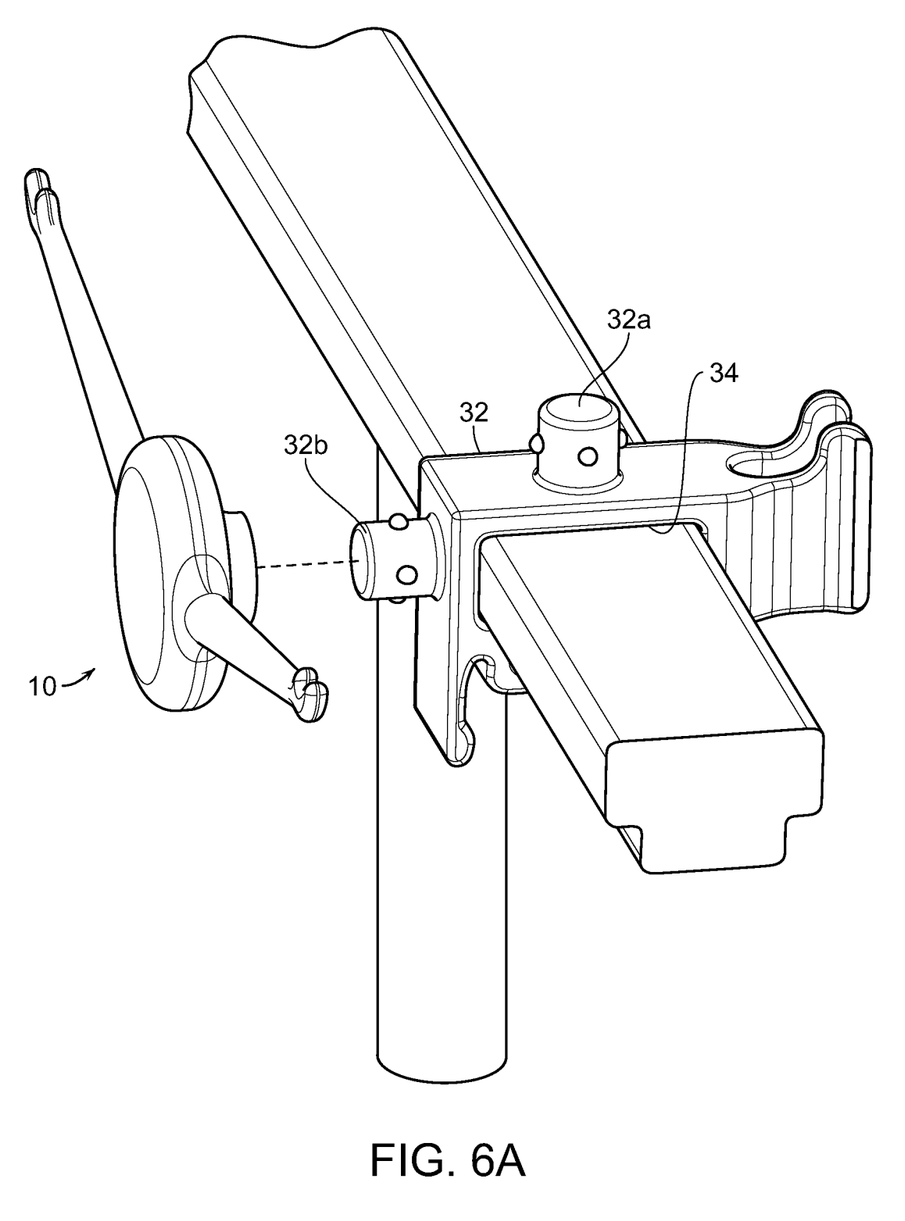
FIG. 6A is an environmental view of a closed rail slot of the mounting device of FIG. 6 installed on an open-ended bed rail.
Figure 6B:
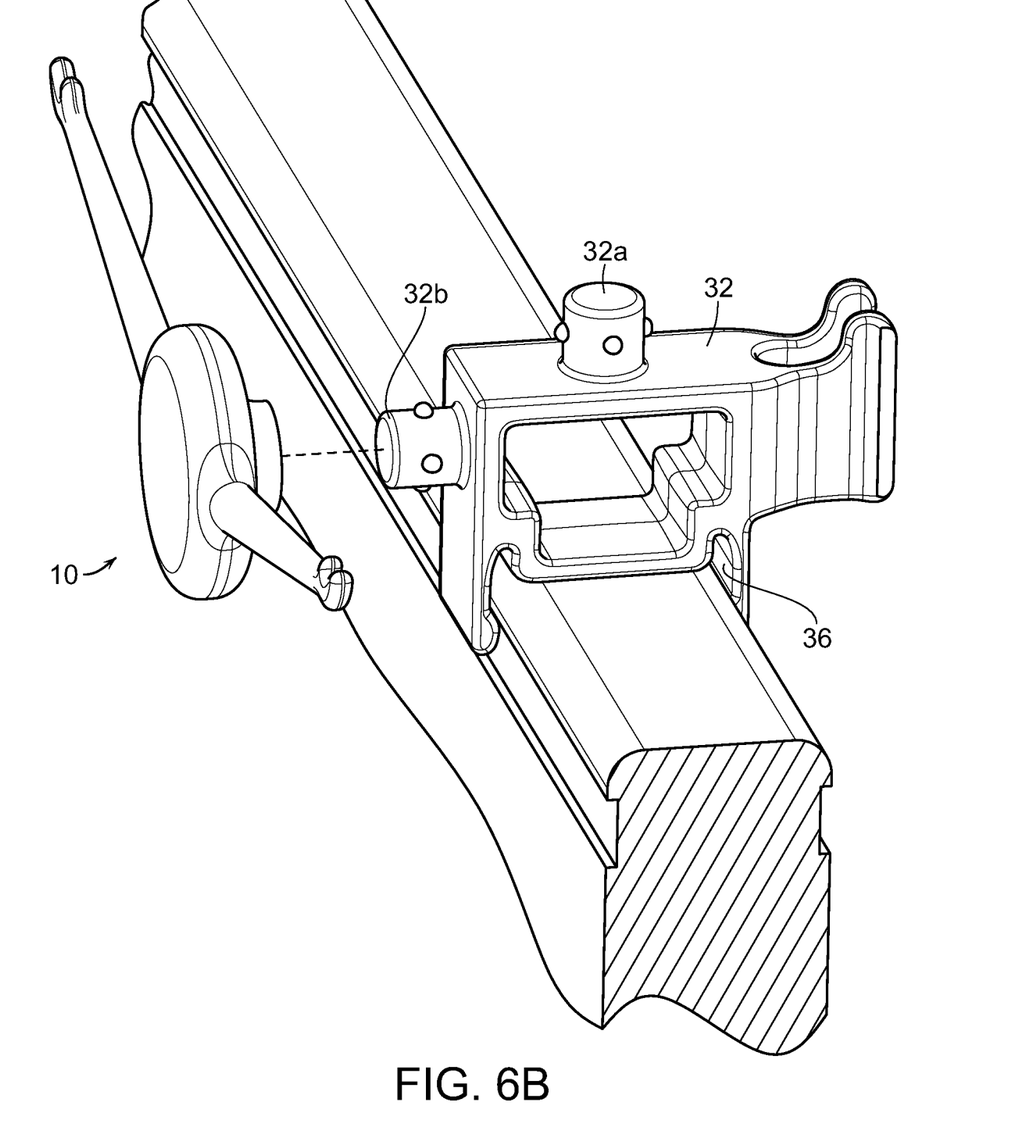
FIG. 6B is an environmental view of an open rail slot of the mounting device of FIG. 6 installed in a closed-ended bed rail.
Figure 6C:
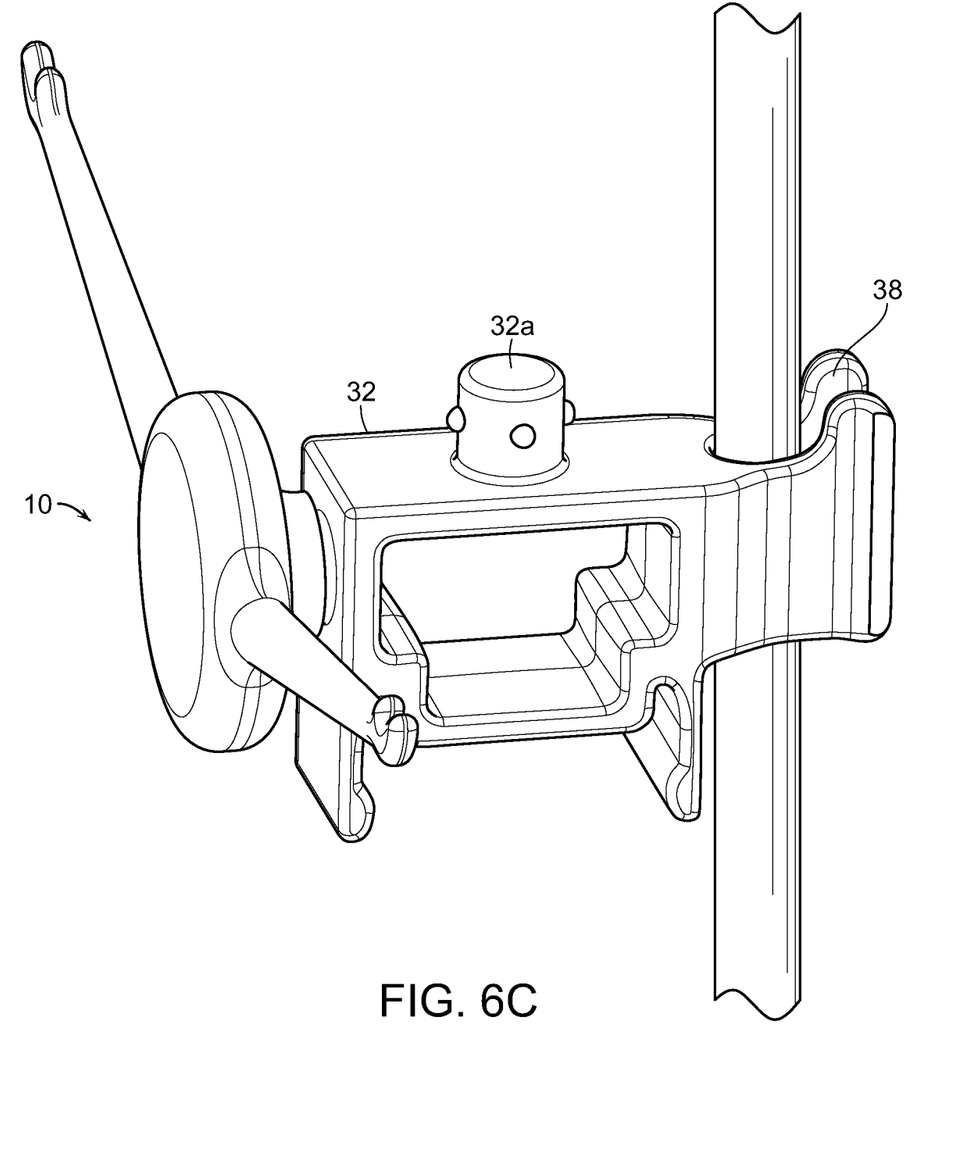
FIG. 6C is an environmental view of a pole slot of the mounting device of FIG. 6 installed on an IV bag pole.

As shown in FIG. 6, the rail adaptor 32 has multiple forms of attachment and connection. The rail adaptor 32 may include multiple post bodies 32a, 32b disposed on differently oriented faces of the rail adaptor 32—each configured for insertion connection to the port 20a. As shown in FIG. 6A, the rail adaptor 24 may include a closed rail slot 34 which is configured to slide onto an open ended bed rail or similar structure found in a medical treatment area. By open-ended bed rail, this description refers to a bed rail that extends, at least in part, beyond a connection or anchor point of the bed rail to the bed frame. As shown in FIG. 6B, the rail adaptor 24 may also include an open rail slot 36 which is configured to snap or clip onto a closed-ended bed rail or similar structure found in a medical treatment area. By closed-ended bed rail, this description refers to a bed rail, or a portion thereof proximate to the patient, that does not extend, in relevant part, beyond a connection or anchor point of the bed rail to the bed frame. As shown in FIG. 6C, the rail adaptor 24 may also include an open pole slot 38 which is configured to slide or clip onto an IV pole or similar structure found in a medical treatment area. The open pole slot 38 may slide onto the IV pole from either end or clip onto the pole at any point between either end of the IV pole.

Figure 7:
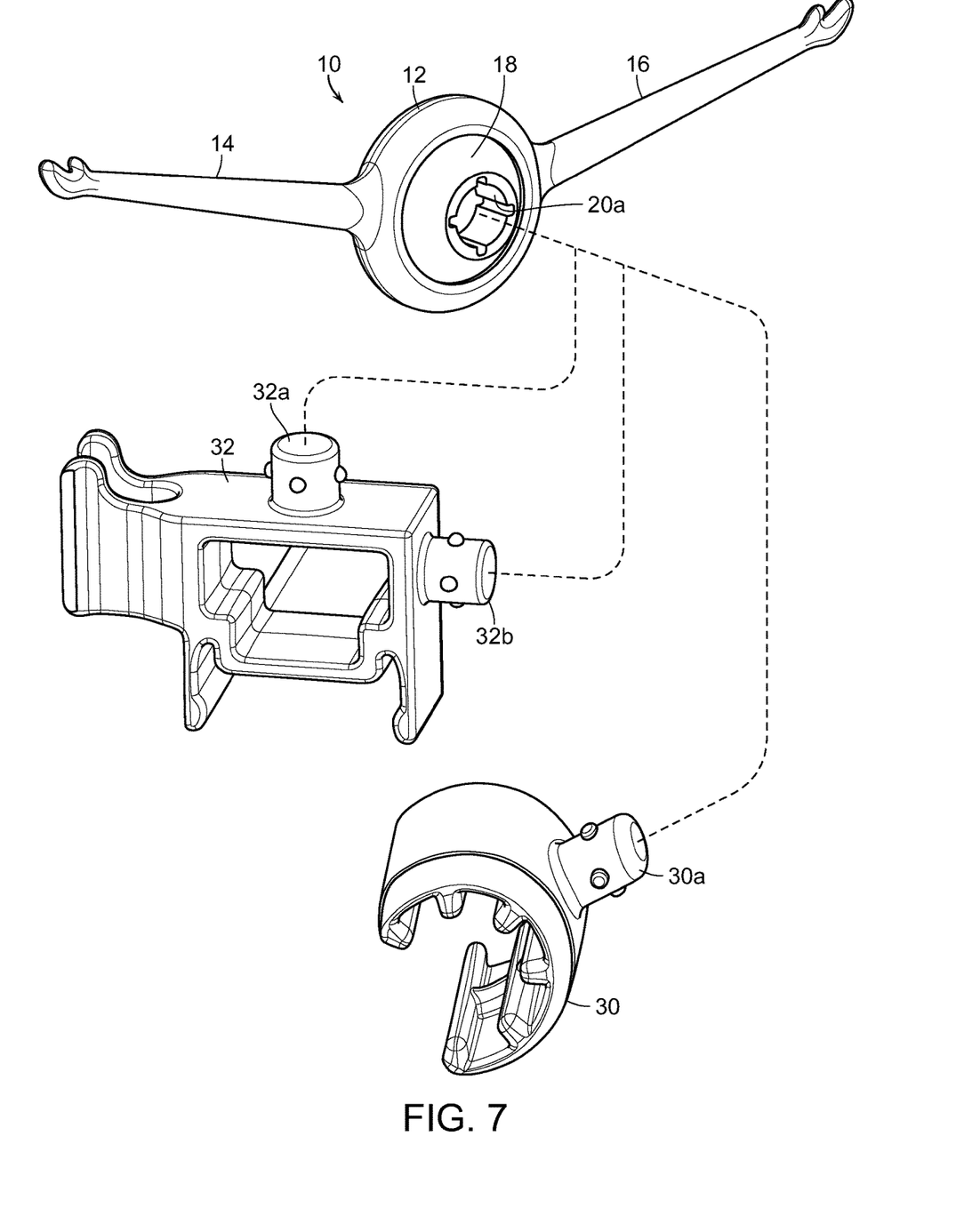
FIG. 7 is a partially exploded perspective view of the first preferred embodiment of the tubing and cable organizing device according to the present invention alternately connected to the mounting devices of FIGS. 5 and 6.

FIG. 7 illustrates the alternate connection of the device 10 to the post bodies 30a, 32a, 32b of the c-clamp 30 and the rail adaptor 32.

Figure 8:
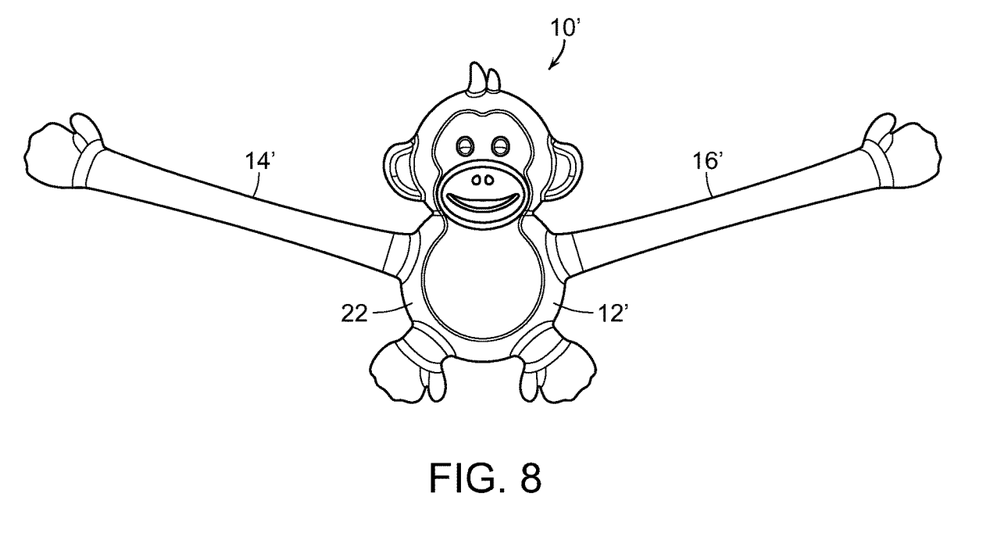
FIG. 8 is a front view of a second preferred embodiment of the tubing and cable organizing device according of the present invention.
Figure 9:
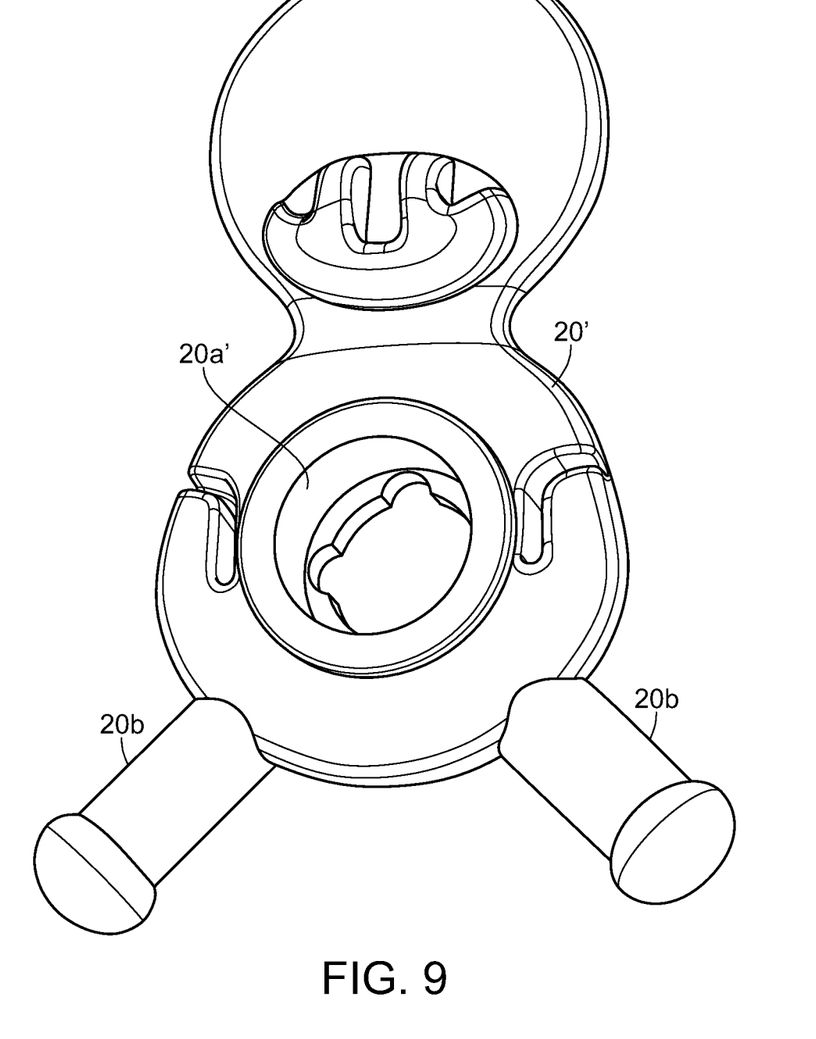
FIG. 9 is a perspective view of an inner core for use with the second preferred embodiment of the tubing and cable organizing device according to the present invention.

FIGS. 8 and 9 illustrate a second preferred embodiment of the organizing device 10'. The second preferred embodiment of the organizing device 10' also includes a main body 12' with first and second appendages 14', 16', including moldable wires 24', 26', similar to those discussed above. This second preferred embodiment has an inner core 20' made of plastic or similarly rigid material and includes a port 20a'. This inner core 20' is covered in the elastic coating 22 and bears a particular ornamental design as described more fully below. The inner core 20' may also include one or more lower posts 20b; providing additional points for holding or supporting tubes and cables.

The benefits of two appendages compared to one, or three (or more) is realized in that a single device 10, 10' may advantageously accommodate the type of anatomy of a human patient, i.e., bi-lateral (left-right) design or upper/lower body. The addition of lower posts 20b' to the inner core 20' provides additional support points. The shorter structure of the lower posts 20b' as compared to the first and second appendages 14', 16' means that the tubing and cables supported by one are kept separate from those supported by another.

As mentioned above, the elastic coating 22 can be formed into ornamental designs or ornamental colors. FIGS. 1-4 illustrate an embodiment of the device 10 that is formed into a generally circular main body 12 with first and second appendages 14, 16 resembling arms and hands. The elastic coating 22 may be formed in any decorative or utilitarian color. The shape of the elastic coating 22 may also be formed into other decorative shapes as desired.

As shown in FIG. 8, the elastic coating is formed into a decorative shape to resemble a monkey with the first and second appendages 14', 16' resembling arms and the lower posts 20b' resembling feet. The decorative shape can be any animal that the user desires. Such feature is particularly useful in neonatal and pediatric settings to provide some pleasurable decoration for the patient. Such animals may include dogs, cats, elephants, giraffes, octopi, or any other animal, with the first and second appendages 14, 16 resembling arms, legs, necks, etc. The ornamental design can also resemble faces, emojis, or everyday objects—whatever is believed to provide enjoyment and/or utility for the patient and the user.

Although several embodiments have been described in detail for purposes of illustration, various modifications may be made without departing from the scope and spirit of the invention. Accordingly, the invention is not to be limited, except as by the appended claims.

What is claimed is:

1. A tubing and cable organizing device, comprising:
    a main body having an inner core covered in an elastic coating;
    a first appendage covered in the elastic coating that extends away from the main body, wherein the first appendage is non-resilient and selectively bendable;
    a second appendage covered in the elastic coating that extends away from the main body at an orientation generally opposite to the first appendage, wherein the second appendage is non-resilient and selectively bendable;
    wherein the elastic coating covering the main body, the first appendage, and the second appendage is unitary giving the tubing and cable organizing device a continuous appearance; and
    an attachment means connected to the inner core of the main body.

2. The tubing and cable organizing device of claim 1, wherein the elastic coating comprises silicone.

3. The tubing and cable organizing device of claim 1, wherein the inner core is a foam, a plastic, or a metal body.

4. The tubing and cable organizing device of claim 1, wherein the inner core has a port configured to receive the attachment means.

5. The tubing and cable organizing device of claim 1, wherein the first appendage contains a moldable wire embedded within the elastic coating.

6. The tubing and cable organizing device of claim 1, wherein the second appendage contains a moldable wire embedded within the elastic coating.

7. The tubing and cable organizing device of claim 1, wherein the attachment means is selected from the group consisting of a suction cup, a c-clamp, a rail adaptor, and a spring clamp.

8. The tubing and cable organizing device of claim 7, wherein the rail adaptor comprises a closed rail slot, an open rail clamp, and an open pole clamp.

9. The tubing and cable organizing device of claim 1, wherein the elastic coating is formed into a decorative shape or a decorative color.

10. The tubing and cable organizing device of claim 9, wherein the decorative shape is selected from the group consisting of an animal, an emoji, a face, a plant, and a toy.

11. The tubing and cable organizing device of claim 1, wherein the first appendage and the second appendage are both anchored to the main body and both end in a grip member distal from the main body.

12. A tubing and cable organizing device, comprising:
    a main body having an inner core covered in a silicone elastic coating;
    a first appendage containing a moldable wire embedded within the elastic coating that extends away from the main body, wherein the first appendage is non-resilient and selectively bendable;
    a second appendage containing a moldable wire embedded within the elastic coating that extends away from the main body at an orientation generally opposite to the first appendage, wherein the second appendage is non-resilient and selectively bendable;
    wherein the elastic coating covering the main body, the first appendage, and the second appendage is unitary giving the tubing and cable organizing device a continuous appearance; and
    an attachment means connected to the inner core of the main body.

13. The tubing and cable organizing device of claim 12, wherein the inner core is a foam, a plastic, or a metal body.

14. The tubing and cable organizing device of claim 12, wherein the inner core has a port configured to receive the attachment means.

15. The tubing and cable organizing device of claim 12, wherein the attachment means is selected from the group consisting of a suction cup, a c-clamp, a rail adaptor, and a spring clamp.

16. The tubing and cable organizing device of claim 15, wherein the rail adaptor comprises a closed rail slot, an open rail clamp, and an open pole clamp.

17. The tubing and cable organizing device of claim 12, wherein the elastic coating is formed into a decorative shape or a decorative color.

18. The tubing and cable organizing device of claim 17, wherein the decorative shape is selected from the group consisting of an animal, an emoji, a face, a plant, and a toy.

19. The tubing and cable organizing device of claim 12, wherein the moldable wire embedded in the first appendage and the moldable wire embedded in the second appendage are both anchored to the main body and both end in a hook or loop contained within a grip member distal from the main body.

* * * * *